United States Patent [19]

Bibb et al.

[11] Patent Number: 4,583,672

[45] Date of Patent: Apr. 22, 1986

[54] EXPLOSIVE WELDING DEVICE

[75] Inventors: Henry Q. Bibb, Lynchburg, Va.; David E. Merker, Minerva; Louis E. Stark, Youngstown, both of Ohio

[73] Assignee: The Babcock & Wilcox Company, New Orleans, La.

[21] Appl. No.: 444,250

[22] PCT Filed: Sep. 24, 1982

[86] PCT No.: PCT/US82/01313

§ 371 Date: Nov. 18, 1982

§ 102(e) Date: Nov. 18, 1982

[87] PCT Pub. No.: WO84/01118

PCT Pub. Date: Mar. 29, 1984

[51] Int. Cl.⁴ ............................................. B23K 20/06
[52] U.S. Cl. ................................. 228/2.5; 228/119; 228/175
[58] Field of Search ............... 228/2.5, 107, 108, 109, 228/119, 175; 29/402.09, 402.16, 451

[56] References Cited

U.S. PATENT DOCUMENTS

| | | |
|---|---|---|
| Re. 30,802 | 11/1981 | Rogers ........................ 29/402.09 |
| 3,158,923 | 12/1964 | Reinsma ........................... 29/451 |
| 3,744,119 | 7/1973 | Hanson et al. .................. 228/109 |
| 3,868,131 | 2/1975 | Zondag ....................... 228/2.5 X |
| 3,912,148 | 10/1975 | Johnson ........................ 228/2.5 |
| 4,028,789 | 6/1977 | Loch ............................. 228/2.5 |
| 4,106,687 | 8/1978 | Bement ........................ 228/2.5 |
| 4,117,966 | 10/1978 | Green ........................... 228/2.5 |
| 4,152,821 | 5/1979 | Scott ........................... 29/421 R |
| 4,216,893 | 8/1980 | Glatthorn ................... 228/119 X |

FOREIGN PATENT DOCUMENTS

| | | | |
|---|---|---|---|
| 3015577 | 10/1980 | Fed. Rep. of Germany | 228/108 |
| 1584451 | 2/1981 | United Kingdom | 228/107 |

*Primary Examiner*—Kenneth J. Ramsey
*Attorney, Agent, or Firm*—Robert J. Edwards; Robert C. Mai; J. Henry Muetterties

[57] ABSTRACT

An explosive welding device is disclosed for securing sleeves within a tubular fluid conveying conduit. The device comprises a shatterable cup member, explosive material secured within the cup, a means for detonating the explosive material and a means for releasably securing the device in position within the sleeve by remote tooling.

2 Claims, 4 Drawing Figures

U.S. Patent   Apr. 22, 1986   Sheet 1 of 2   4,583,672
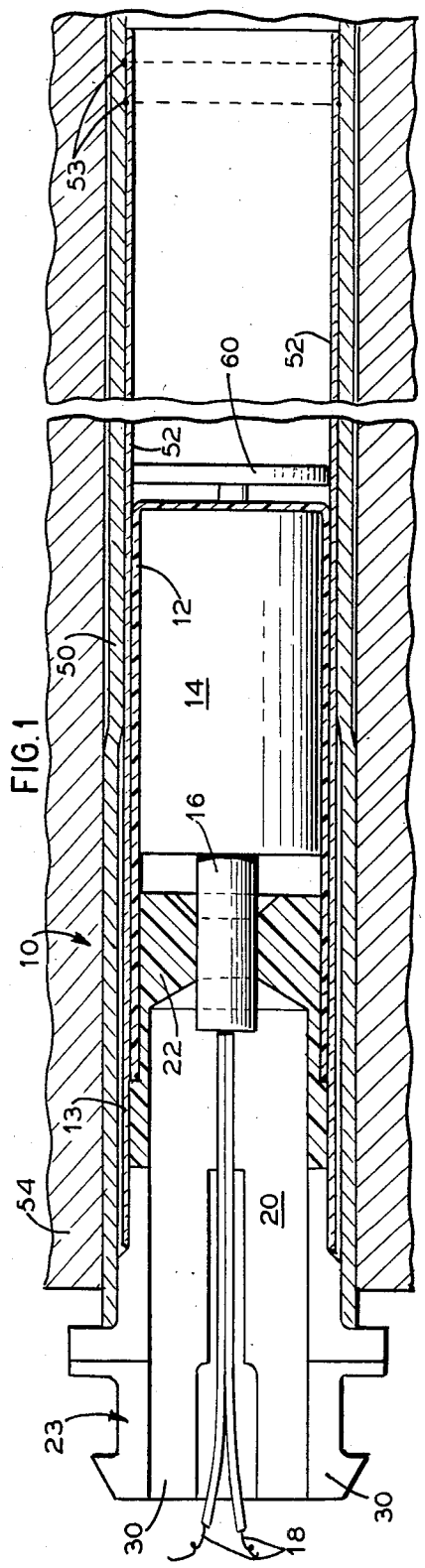
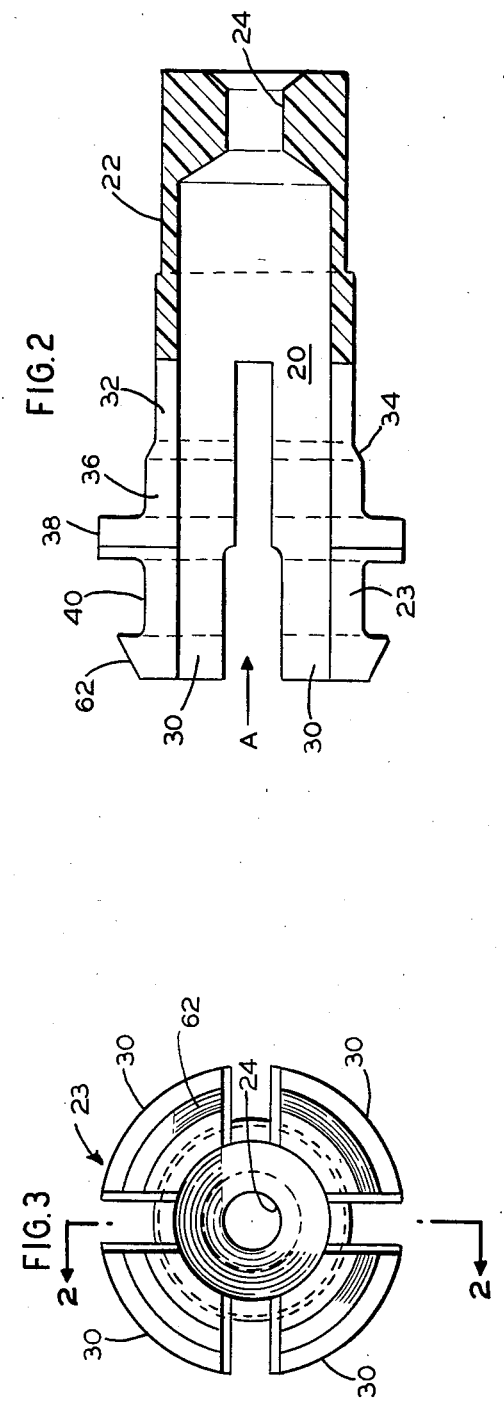

EXPLOSIVE WELDING DEVICE

BACKGROUND OF THE INVENTION

This invention relates generally to an apparatus and method for securing; by welding, two coaxial tubes or a tubular sleeve coaxially within a fluid conduit.

There exists, in a variety of embodiments, fluid conduits which themselves are surrounded by a fluid environment. One such example is that of a tube and shell heat exchanger wherein a first fluid is contained within the fluid conduit and a second fluid surrounds the exterior of the conduit such that the heat exchange between the two fluids is effected. Such fluid conduits may from time to time develop leaks. These leaks permit fluid communication between the first and second fluids which may not be tolerable as in the case of a pressurized water nuclear steam generator where the fluids are substantially different pressures and one fluid contains radioactivity while the other does not. For this reason, fluid communication between the two fluids through a leak in the tube should be minimized.

When the fluid conduits are readily accessible, a variety of techniques may be employed to repair the ruptured conduit directly or to install a sleeve device or a plug into the conduit which stops the leak or completely isolates the entire conduit from a fluid source. However, in some environments, including that of a nuclear heat exchanger, it may be difficult for reasons of inaccessibility or biological hazard to effect such repairs. In such instances, techniques have been developed for plugging the fluid conduits from a remote location and thus totally removing them from service. Either rolling, explosive expansion and/or welding have been used to secure plugs in the tube ends. Roll expansion and welding are rather difficult to apply as remote operation and as a result explosive expansion has emerged as the most viable means of plugging tubes by remote operation.

A serious drawback to plugging both ends of a heat exchanger tube is that eventually as more and more tubes are plugged the capacity of the steam generator becomes less and less. Plugging requires removing an entire tube from operation when in general only a small localized zone of the tube is involved in the leak. Attempts have been made to install sleeving within the tube to isolate the portion of the tube which has degraded thereby stopping the leak. Those in the art have been primarily concerned with the development of an absolutely leak proof joint obtained by brazing, mechanical or explosive expansion, explosive welding or some other means, such as shown in U.S. Pat. No. Re. 30,802 (Rodgers), U.S. Pat. No. 3,140,537 (Popoff) and U.S. Pat. No. 3,402,870 (Carlson et al). However, in the past these metallurgical bonding techniques were not amenable to remote installation because of the need for cleanliness, close fittings, heat application and atmosphere control.

SUMMARY OF THE INVENTION

The present invention relates to a device and method of forming a metallurgical joint for welding coaxial tubes or securing a coaxially disposed tubular sleeve within a conduit. The explosive welding device to be used to weld repair sleeves to defective steam generator tubes comprises a cup member having explosive material secured therein, a plug attached to the cup member, said plug having remotely operable means for releasably securing the device at a predetermined position within the tube and a means for detonating the explosive material. In addition, the explosive welding device may also includes a means for centering the device within the defective tube. The invention further comprises the method of securing tubular sleeves within a fluid conduit comprising the steps of inserting and positioning the sleeve in the conduit. Thereafter applying an explosive force from within the sleeve and at one end thereof, sufficient to cause a portion of the sleeve and the inner wall of the conduit into contact with each other. A heating device is inserted into the sleeve to coincide with the expanded area and effect brazing of the sleeve to the conduit along the contacted area, and explosively welding the other end of the sleeve to the conduit. The sealed sleeve isolates the defective section of the conduit from fluid flow within the conduit and further increases the strength of the conduit in this area.

BRIEF DESCRIPTION OF THE DRAWINGS

FIG. 1 is a side elevation view showing the explosive welding device secured within a repair sleeve according to the present invention.

FIG. 2 is a side elevation view of the plug member.

FIG. 3. is the end elevation view of the collapsable members.

DESCRIPTION OF THE PREFERRED EMBODIMENTS OF THE INVENTION

Figure 4:
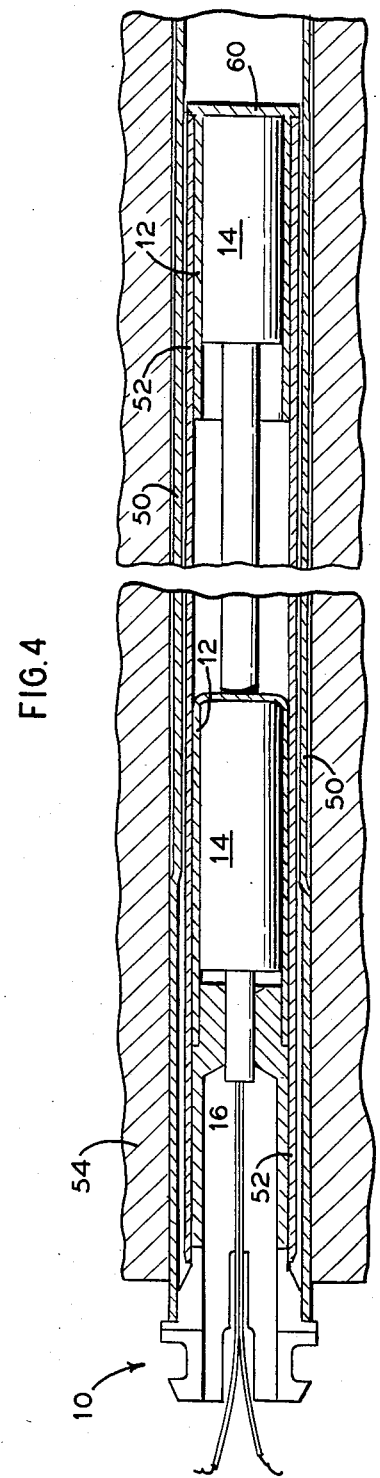
FIG. 4 is a side elevational view of an alternative embodiment of the explosive welding device.

FIGS. 1 and 2 illustrate the improved explosive welding device 10 of the present invention. As shown the device 10 is comprised of a front cup member 12 which is constructed of a plastic material of sufficient brittleness to shatter into small fragments when the device 10 is exploded. Within cup member 12 is an explosive material 14. In contact with one end of the explosive material 14 is an electric detonator 16 having wires 18 extending therefrom. The wires or cables 18 are connected to a firing box (not shown) which is located in an area remote from the steam generator tube to be repaired. The explosive material 14 of the device are sealed with adhesive into the plastic cup member 12 thereby making the device resistant to moisture and water proof for possible underwater use.

As shown in the drawings, the back end of the explosive device 10 is composed of a plug 20. The plug 20 consists of front and rear portions 22 and 23 respectively. The leading edge of the plug 20 is of slightly smaller diameter than the remainder of the front portion 22 in order that the lip 13 of the cup member 12 can be tightly fitted over the plug 20. Within the central portion of the front end 22 of plug 20 is detonator bore 24. The detonator bore 24 is of such a size to allow the detonator 16 to snuggly fit therein. When the cup member 12 and plug 20 are joined, the detonator 16 is in contact with the explosive material 14.

The rear portion 23 of the plug is comprised of four collapsable members 30. The collapsing members 30 are of a ductile, strong plastic material shaped in such a manner that they will collapse to a diameter smaller than the inner diameter of the tube 50 to be repaired. The collapsed members 30 apply a spring force against the inner diameter of the tube 50 so that it will remain securely positioned when inserted into a tube of a vertical tubed steam generator.

As shown in FIGS. 2 and 3 the collapsable members have an initial flat area 32 with a diameter substantially equal to the diameter to that of the cup member 12. The initial flat portion 32 turns into a gradual taper 34 to a second flat area 36. A flange portion 38 which acts as an insertion stop for the device 10 exists after the second flat section 36 and terminates in a recess 40 which has been designed for use for remote tool handling. During insertion of the device on the tooling, the device is pushed into the direction A into the tool holder (not shown). The tool holder is cylindrical with a lip which mates with the recess 40. Interference of the tapered leading edge of the device 62, as it comes in contact with the lip on the tool holder causes the collapsable member 30 to move toward the center of the device. When the lip of the tool holder moves into alignment with the recess 40, the collapsable members 30 return to the original position and the device is securely positioned on the tool holder, which is either manual or automatic tooling. The tool is then positioned to insert the device 20 into the tube 50 to be repaired. During insertion into the tube, the gradual taper 34 comes into interference with the tube 50. Continued insertion collapses the members 30 which automatically releases the device from the tool holder. When the device is in the tube and released from the tool holder, the collapsable members 30 exert a spring force, at the second flat portion 36 against the inside of the tube 50 as shown in FIG. 1 by Arrows B. It is this force which is capable of supporting and retaining the explosive device 10 at the designated position, either in a horizontal or vertical tube, until the damaged tube is repaired.

FIG. 4 shows an alternative embodiment of the present invention wherein two explosive welds are performed simultaneously.

In the preferred embodiment of the invention a centering device 60 as shown in FIG. 1 is attached to the front of cup member 12. The disc-shaped centering device 60 insures that the welding device 10 is axially aligned within tube 50. The front cup member is constructed of a plastic material of sufficient brittleness to shatter into small fragments when the device is exploded. Acrylic plastics, such as melamine formaldehyde, urea formaldehyde or methyl methacrylate, are satisfactory. Strong ductile plastic cups are not satisfactory as they do not shatter and would therefore become wedged in the tube and act like a plug. The explosive material 14, for example nitrostarch, nitroguanidine, amatol or pentolite, in amounts of 2.5–3.5 grams, is packed into the cup with a force adequate to produce a desired density of 0.35–0.7. A small amount of RDX (cyclotrimethylemetrinitramins), PETN (pentadrythrictol tetranitrate) or TACOT (tetranitrodibenzo-1, tetra-azpentalena), is packed on top of the explosive material 14 to serve as a booster. A thin coat of adhesive is applied to the lip 13 of the cup member 12 and to the outside of the leading edge of plug 20. The plug 20 with the detonator 16 already fix thereto, is inserted into the cup member 12. The plug member 20 is constructed of a acetal resin, such as Delrin (a trademark of the Dupont DeNemours EI & Co.), nylon or polyethalene.

The front section of the plug can be of varied length in order to adjust the final position of the explosive cartridge and weld area within the tube. It is also understood by those skilled in the art that the back end of the plug can be composed of, for example, one rigid member and one collapsable member as detailed above. The collapsable member would unilaterally supply the spring force to support the device in a desired position. The use of the four identical members along with the centering member 60 ensures that the device 10 will be properly centered within the defective tube even though all operations are carried out with remote tooling.

Reffering to FIG. 1 the method of securing a repair sleeve 52 with the defective tube 50 will be described in greater detail. The outer diameter of the sleeve 52 is smaller than the inner diameter of the defective tube, thus the sleeve can be moved axially through the tube to the desired position therein with the ends of the sleeve 52 extending beyond the damaged area(s) which it is desired to isolate from the fluid flow within the tube 50. As shown in FIG. 1, one end of sleeve has at least one braze ring reservoir 53 on the outside of the sleeve. Once the sleeve is positioned in the desired location within the tube, suitable means are used to apply a radially outward direction explosive force from within the sleeve 52 to the sleeve end having the braze ring reservoir 53. The force is of a magnitude to cause the sleeve to expand radially outward into contact with the inner wall of tube 50 and to further cause slight outward deformation of the sleeve 52 and tube 50. Because the sleeve and the tube have essentially equivalent elastics constants, and the tube is stressed to the same level as the sleeve, a slight mechanical clearance may exist between the sleeve and the tube in the expanded areas. As a result, the seal will not be leak proof. A heater is inserted into the sleeve and positioned coaxially within the expanded area the heater causes the braze reservoir(s) to flow into the area between the sleeve 52 and the tube 50 in order to obtain the leak proof seal.

The opposite end of the sleeve 52 terminates in a region of the tube 50 which is located within the tube sheet 54. The explosive welding device 10 as described above is inserted into the tube 50 until further insertion is prevented by the flange 38 of the collapsible members 30. The device is thereafter detonated in order to effect a weld at the second end of the sleeve. The sleeve will provide mechanical strength in the axial direction capable of preventing separation of the tube 50 in the degraded area should the tube wall fail completely.

In the preferred method of operation, the tube is subject to a cleaning operation in the areas of the braze and weld operations in order to remove any oxides or other material which would hinder the metallurgical bonds. The steps of cleaning, explosive expanding, brazing and explosive welding can be carried out remotely in order to minimize or eliminate human exposure to harmful radiation effects. And as pointed out in the above discussion, the explosive welding device is especially designed for remote tooling handling in order to position, center and support the device in the defective tube.

The embodiments of the invention in which an exclusive property or priviledge is claimed are defined as follows:

1. An explosive welding device to be used to weld a sleeve to a defective steam generator tube comprising; a cup member, explosive material secured within the cup, a plug attached to the cup member having remotely operable means for releasably securing the device into the tube having at least one spring acting collapsible member and, a means for detonating the explosive material.

2. An explosive welding device to be used to weld a sleeve to a defective steam generator tube comprising; a cup member, explosive material secured within the cup, a plug attached to the cup member having remotely operable means for releasably securing the device into the tube, means for centering the device within the sleeve within the defective tube including a solid cylindrical member spaced from and attached to the cup and having a diameter approximating the inner diameter of the sleeve and, a means for detonating the explosive material.

* * * * *